W. H. POTTER.
PIPE CUTTER.
APPLICATION FILED DEC. 23, 1914.

1,177,721.

Patented Apr. 4, 1916.
3 SHEETS—SHEET 1.

Witnesses:
John Enders.
M. H. Holmes.

Inventor:
William H. Potter,
by Robert Burns,
Atty.

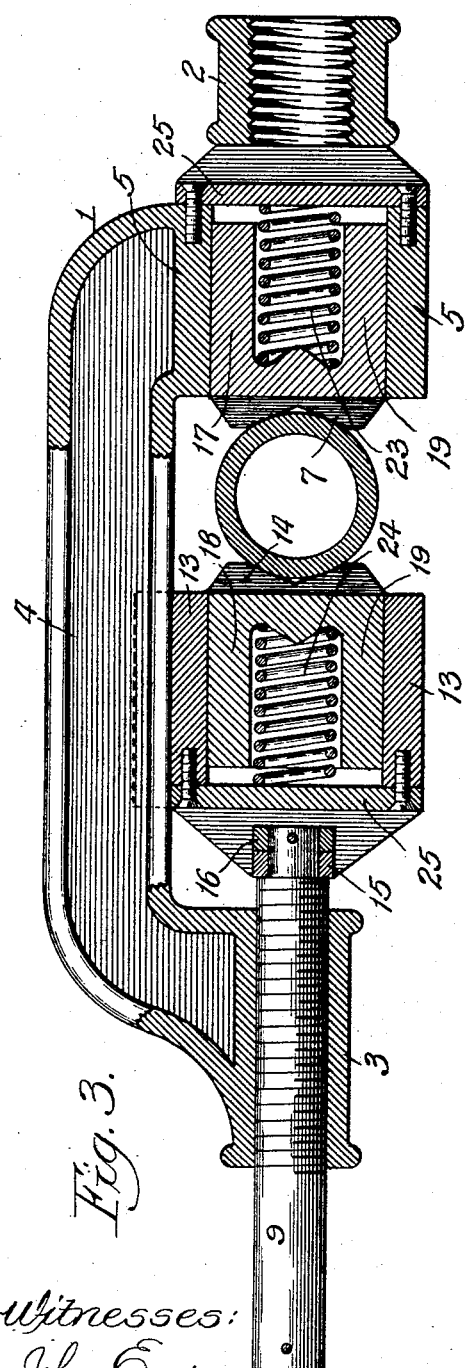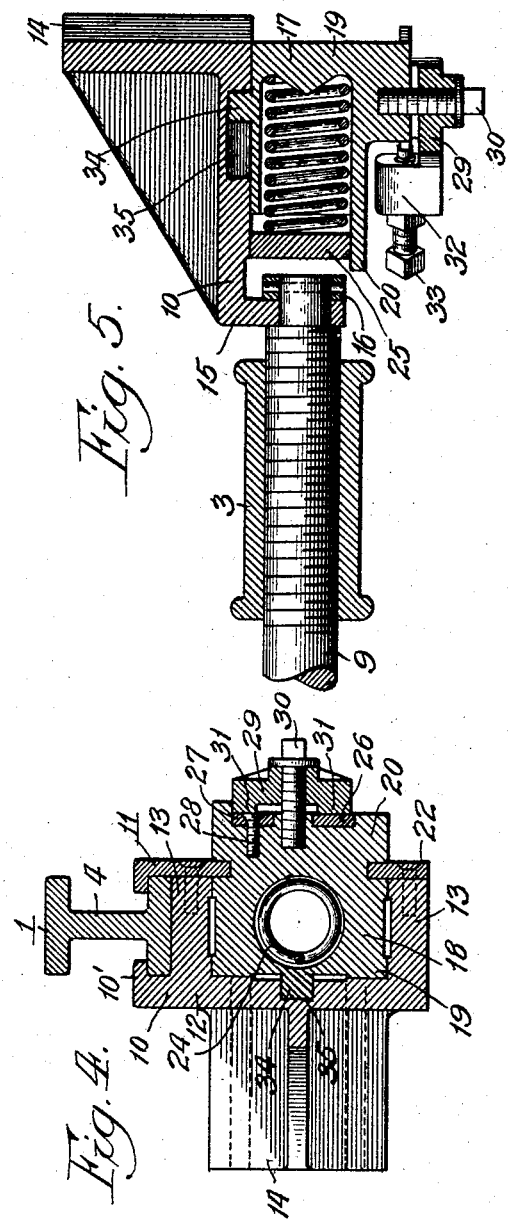

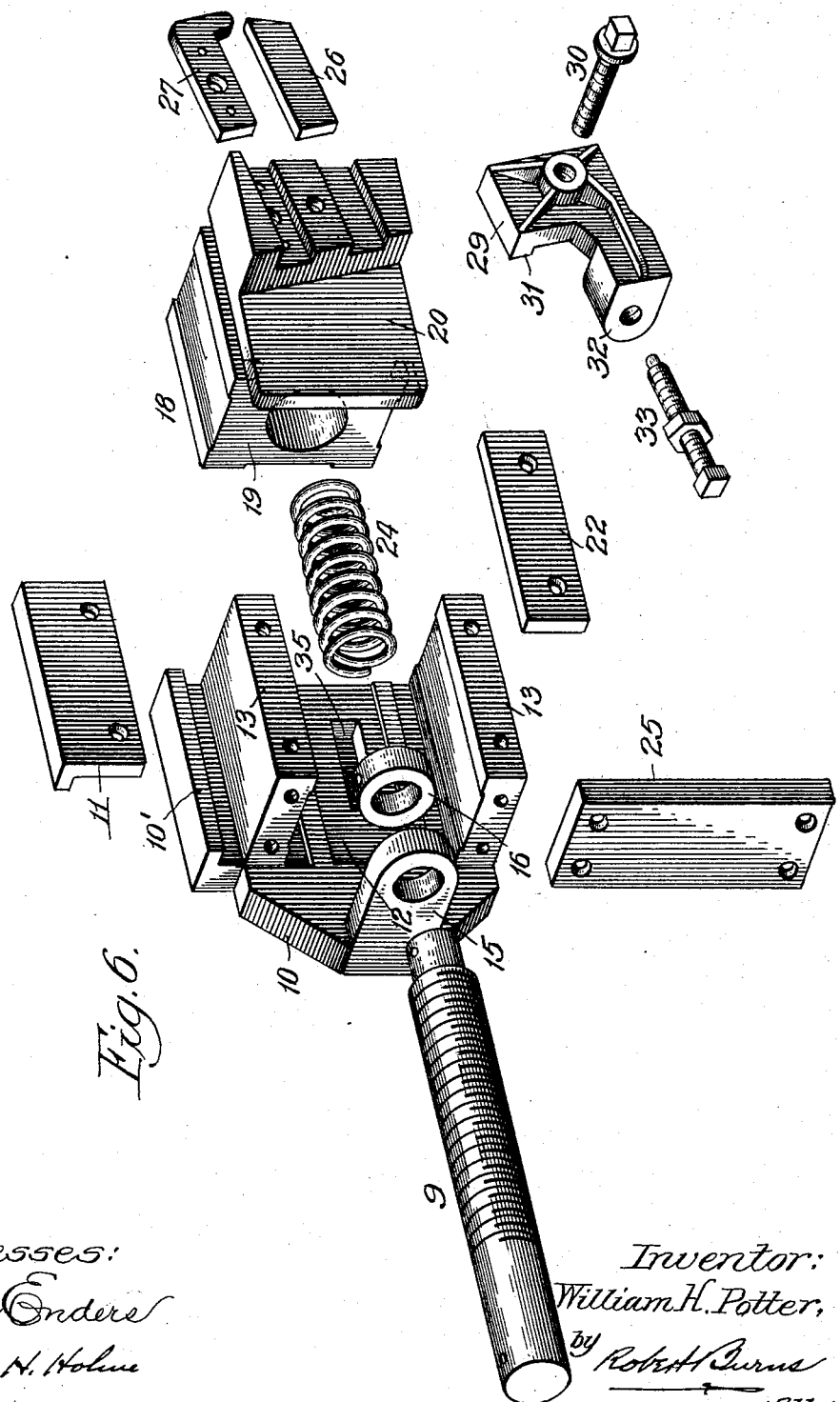

UNITED STATES PATENT OFFICE.

WILLIAM H. POTTER, OF CHICAGO, ILLINOIS, ASSIGNOR TO NYE TOOL AND MACHINE WORKS, OF CHICAGO, ILLINOIS, A CORPORATION OF ILLINOIS.

PIPE-CUTTER.

1,177,721.

Specification of Letters Patent.

Patented Apr. 4, 1916.

Application filed December 23, 1914. Serial No. 878,641.

*To all whom it may concern:*

Be it known that I, WILLIAM H. POTTER, a citizen of the United States of America, and a resident of Chicago, in the county of Cook, State of Illinois, have invented certain new and useful Improvements in Pipe-Cutters, of which the following is a specification.

This invention relates to that type of pipe cutters in which a masked or gaged cutter blade is spring impelled and adapted to complete the pipe cutting operation with a single primary adjustment of the mechanism. And the present improvement has for its object to provide a simple and convenient formation and combination of parts in the above described type of pipe cutters, whereby the cutting blade is capable of ready and accurate adjustment to attain any desired depth of cut and is masked or guarded to attain and not exceed such predetermined depth of cut during its continued operation upon a section or length of pipe.

A further object is to provide a strong and efficient structural formation and association of the pipe holding and cutter carrying parts of the pipe cutter, providing lightness and strength combined with effectiveness and uniformity in attaining a smooth and even cutting action, all as will hereinafter more fully appear.

Figure 1:
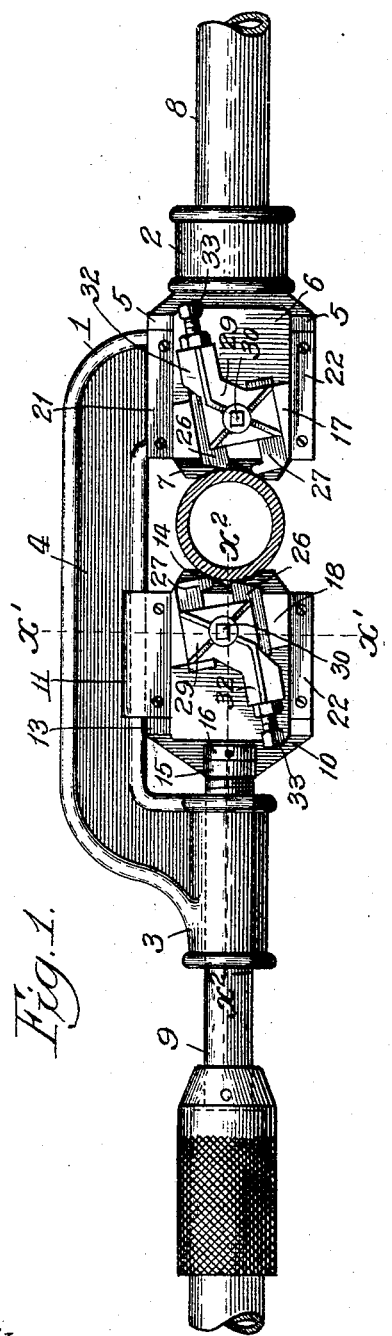
Figure 2:
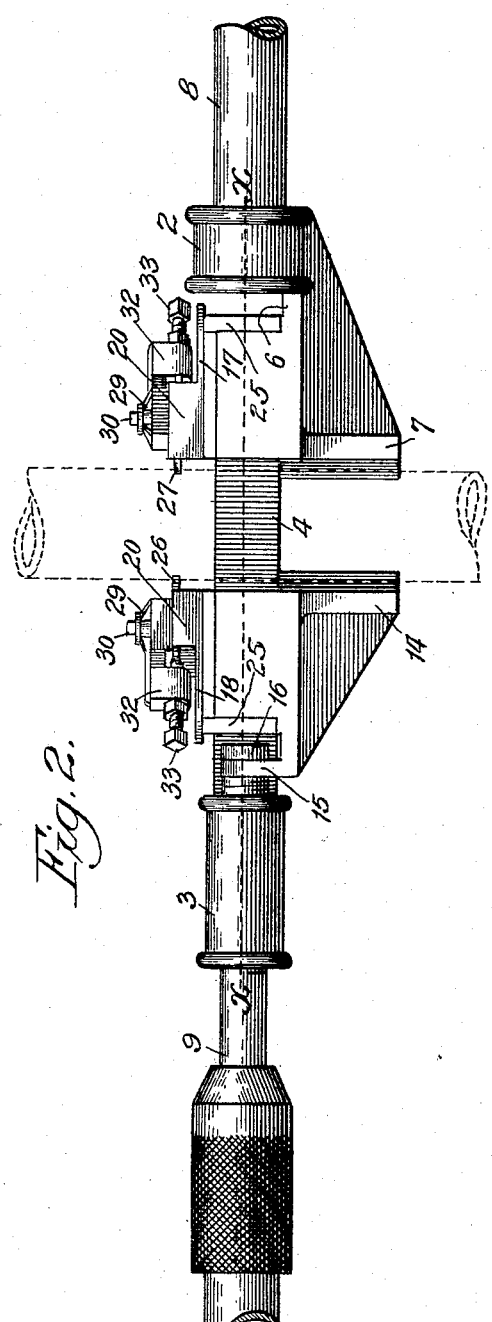

In the accompanying drawings:—Figure 1, is a side elevation of a pipe cutter embodying the present invention. Fig. 2, is a bottom view of the same. Fig. 3, is an enlarged longitudinal section on line $x$—$x$ Fig. 2. Fig. 4, is an enlarged transverse section on line $x'$—$x'$, Fig. 1. Fig. 5, is an enlarged detail longitudinal section on line $x^2$—$x^2$, Fig. 1. Fig. 6, is a perspective view illustrating parts of the mechanism in a separated condition.

Similar reference numerals indicate like parts in the several views.

Referring to the drawings, 1 represents the main frame or stock of the pipe cutter, which in the present construction comprises a pair of alined socket hubs or sleeves 2 and 3, integrally connected together in spaced relation by an offset connecting rail 4, preferably of an I shape in cross-section, as shown in Figs. 3 and 4. Adjacent to the socket hub 2, and in longitudinal spaced relation thereto, the main stock 1 is formed with a pair of longitudinally extending webs or flanges 5, spaced apart by a connecting web 6 to provide an open sided channel or way for one of the hereinafter described cutter carrying heads of the present mechanism.

7 designates one of the laterally disposed holding jaws of the mechanism, having the usual V shape, adapting it for centering engagement with the section of pipe operated on, and said jaw is preferably formed as an integral part of the main stock 1, as a lateral extension from the connecting web 6 of the pair of flanges 5, aforesaid.

8 and 9 designate the operating handles by which the pipe cutter is manipulated, and which engage in screw-threaded longitudinal bores of the aforesaid socket hubs 2 and 3. As usual in the present type of pipe cutters, one of the handles 8, is screwed fixedly into place in its hub 2, while the other handle 9 screws longitudinally through its hub 3, to provide longitudinal adjustment for said handle and for its associated longitudinally adjustable carrying frame of the pipe cutting mechanism, now to be described.

10 designates the adjustable carrying frame above referred to, and which has a longitudinally sliding movement upon the offset connecting rail 4 of the main stock 1, and is held to movement thereon by an integrally formed L shape flange 10′ at one side and a detachable L shape flange or plate 11 at the other side, and said flanges 10′ and 11 have holding engagement with the adjacent longitudinal web of the aforesaid rail 4, as shown more particularly in Fig. 4. In the present construction, the frame 10 comprises a connecting back web 12, a pair of longitudinally extending webs or flanges 13, in spaced relation, to form an open sided channel or way for the cutter carrying head hereinafter described, and a laterally disposed pipe holding jaw 14 extending laterally from the connecting web 12, aforesaid. The holding jaw 14, has opposed relation to the holding jaw 6, before described, is of a like V shape.

15 designates an orificed lug extending laterally from the outer end of the sliding frame 10, aforesaid, with its orifice adapted to receive the reduced inner end of the adjustable handle 9, which is secured in said orifice by a bearing collar 16, or other usual means which provides an operative connection between the parts.

17 and 18 designate the cutter carrying heads of the present mechanism, and having an approximately counterpart construction. The head 17 is adapted to fit and have longitudinal movement in the open sided channel formed in the main stock 1, by the webs 5 and 6 above described, while the head 18 is adapted to fit and have longitudinal movement in the open sided channel formed in the carrying frame 10, by the webs 12 and 13, above described.

In the present improvement each of the cutter carrying heads 17 and 18, will comprise a main rectangular body portion 19 corresponding in transverse dimensions with that of its receiving channel in the main stock 1, or in the carrying frame 10. Said body portion 19 is formed with a central longitudinal cavity for the reception of the hereinafter described individual spring by which the particular carrying head is resiliently impelled toward the median line of the pipe cutting mechanism, and with a side plate portion 20, of a less height than said head, the forward part of said plate portion 20 having a vertical side in which are formed oblique recesses or channels for the reception of an individual cutter blade and its companion gage blade of the present mechanism, and hereinafter described in detail.

21, 22, designate confining strips or plates, secured to the before described webs 5, of the main stock 1, and to the webs 13 of the sliding head 10, and adapted to confine the cutter carrying heads 17 and 18 in the channels formed by the aforesaid webs. In the construction shown in the drawings, the function of one of the plates or strips 21 is performed by the lower portion of the plate or flange 11 before described.

23, 24 designate the springs, above referred to, and which are individual to the longitudinal cavities of the cutter carrying heads 17 and 18, and have bearing at their inner ends against the respective bottom webs of said cavities, as shown more particularly in Fig. 3. The other and outer ends of said springs 23, 24 have bearing against bridge plates 25 secured to the ends of the webs 5 of the main stock 1, and webs 13 of the sliding head 10, respectively.

26 designates the opposed pair of cutter blades of the present structure, each blade being individual to a head 17 or 18, and disposed in the hereinafter longitudinally adjustable manner in its individual channel in the aforesaid vertical ridge 20 of its carrying head 17 or 18.

27 designates the opposed pair of gage blades of the present structure, each gage blade is individual to a cutter blade 26, and is adapted to limit the depth of cut taken by said cutter blade, and to such end each gage blade 27 is secured by a screw 28, or like fastening means, in an individual channel in the aforesaid vertical ridge 20 of a carrying head 17 or 18.

29 designates counterpart clamping jaws or members attached to the respective cutter carrying heads 17, 18, by clamping screws 30, and provided with a pair of bearing ribs 31 adapted to bear individually upon the respective cutter blades 26 and upon the gage blades 27, to wholly maintain the cutter blades 26 in place, after an adjustment, and to aid the aforesaid screws 28 in holding the gage blades 27 in place.

32 designates outward extensions or lugs on the clamping members or jaws 29, provided with screw-threaded orifices for the passage of adjusting screws 33, the inner ends of which have bearing against the outer ends of the aforesaid cutter blades 26, and are adapted to adjust said cutter blades toward the median line of the tool.

34 designates a lateral stop lug formed on one side of each cutter carrying head 17, 18, and having movement in an elongated recess 35, in the web 6 of the main stock 1, in one instance, and in the web 13 of the sliding frame 10, in the other instance, and the function in either case is to restrain the cutter carrying heads 17, 18, from too great an inward movement independent of the holding jaws 7 and 14 before described.

The operation of the present tool or structure is as follows:—Previous to and during the application of the tool to a section or length of pipe to be cut, the cutter carrying heads 17, 18, are at their extreme inmost position under the influence of the springs 23, 24, and with the stop lugs 34 in contact with the inner ends of the elongated recesses 35. The operator, then by a rotation of the handle 9, causes the holding jaw to advance upon, center and hold the section of pipe between said jaw 14, and the companion jaw 7 and during such operation, the respective cutter carrying heads 17 and 18 are forced outward, causing a compression of the respective springs 23, 24, which is subsequently made use of to automatically force the cutter carrying heads inward as the cutting of the pipe section progresses. The construction is such that a single primary adjustment just described is all that is needed for attaining a complete severance of the pipe section operated on.

Having thus fully described my said invention, what I claim as new and desire to secure by Letters Patent, is:—

1. In a pipe cutter of the class herein described, the combination of a main stock, a pair of pipe holding jaws associated with said stock and adjustable toward each other, a spring impelled cutter carrying head associated with one of said jaws and formed with a pair of holding recesses in its side, a cutter blade adjustably secured in one of said recesses, and a gage blade fixedly secured in the other of said recesses, substantially as set forth.

2. In a pipe cutter of the class here described, the combination of a main stock, a pair of pipe holding jaws associated with said stock and adjustable toward each other, a spring impelled cutter carrying head associated with one of said jaws, a cutter blade and a gage blade carried by said head, and means for imparting adjustment to the cutter blade independent of the gage blade, the same comprising a clamping plate formed with a lug having a screw-threaded orifice, an adjusting screw arranged in said orifice, and a clamping screw for holding said clamping plate in place, substantially as set forth.

3. In a pipe cutter of the class herein described, the combination of a main stock provided with a holding jaw and with a longitudinal channel, a spring impelled cutter carrying head arranged in said channel and having a pair of holding recesses in its side, a sliding frame associated with said stock and formed with a holding jaw and a longitudinal channel, a spring impelled cutter carrying head arranged in said channel and having a pair of holding recesses in its side, a longitudinally adjustable handle operatively connected to the sliding frame aforesaid and adapted to force the same inwardly, cutter blades adjustably secured in one of each pair of recesses, and gage blades fixedly secured in the other one of each pair of recesses, substantially as set forth.

4. In a pipe cutter of the class herein described, the combination of a main stock provided with a holding jaw and with a longitudinal channel, a spring impelled cutter carrying head arranged in said channel, a sliding frame associated with said stock and formed with a holding jaw and a longitudinal channel, a spring impelled cutter carrying head arranged in said channel, a longitudinally adjustable handle operatively connected to the sliding frame aforesaid and adapted to force the same inwardly, cutter blades and gage blades carried by said carrying heads, and means for imparting adjustment to the cutter blades independent of the gage blades, the same comprising clamping plates provided with lugs having screw-threaded orifices, adjusting screws arranged in said orifices, and clamping screws for holding said clamping plates in place, substantially as set forth.

5. In a pipe cutter of the class herein described, the combination of a main stock provided with a holding jaw and with an open sided longitudinal channel a spring impelled cutter carrying head arranged in said channel and having a pair of holding recesses in its side, plates secured to the stock and adapted to hold said head in place, a sliding frame guided on said stock and having a holding jaw and a longitudinal channel, a spring impelled cutter carrying head arranged in said channel and having a pair of holding recesses in its side, plates secured to said frame and adapted to hold said head in place, a longitudinally adjustable handle operatively connected to the sliding frame aforesaid and adapted to force the same inwardly, cutter blades adjustably secured in one of each pair of recesses, and gage blades fixedly secured in the other one of each pair of recesses, substantially as set forth.

6. In a pipe cutter of the class herein described, the combination of a main stock, a pair of pipe holding jaws associated with said stock and adjustable toward each other, a spring impelled cutter carrying head associated with one of said jaws, a cutter blade and a gage blade carried by said head, means for imparting adjustment to the cutter blade independent of the gage blade, and a lateral lug on said head, the adjacent portion of a holding jaw having an elongated recess adapted to receive said lug and limit the independent movement of the head, substantially as set forth.

Signed at Chicago, Illinois, this 19th day of December, 1914.

WILLIAM H. POTTER.

Witnesses:
  HARRY G. NYE,
  JOHN E. BENSON.

Copies of this patent may be obtained for five cents each, by addressing the "Commissioner of Patents, Washington, D. C."